(12) United States Patent
Chen

(10) Patent No.: US 10,995,791 B1
(45) Date of Patent: May 4, 2021

(54) PULL BUCKLE

(71) Applicant: Dongguan Jiasheng Enterprise Co., Ltd, Guangdong (CN)

(72) Inventor: Silong Chen, Guangdong (CN)

( * ) Notice: Subject to any disclaimer, the term of this patent is extended or adjusted under 35 U.S.C. 154(b) by 0 days.

(21) Appl. No.: 16/731,075

(22) Filed: Dec. 31, 2019

(30) Foreign Application Priority Data

Nov. 30, 2019 (CN) .......................... 201911208015.6

(51) Int. Cl.
*F16C 11/10* (2006.01)
*F16B 45/02* (2006.01)
*A01K 27/00* (2006.01)

(52) U.S. Cl.
CPC .......... *F16C 11/103* (2013.01); *A01K 27/005* (2013.01); *F16B 45/02* (2013.01)

(58) Field of Classification Search
CPC ....... F16V 11/103; A01K 27/005; F16B 45/02
See application file for complete search history.

(56) References Cited

U.S. PATENT DOCUMENTS

| | | | | |
|---|---|---|---|---|
| 4,903,638 | A * | 2/1990 | Lacey | A01K 27/005 119/776 |
| 5,450,820 | A * | 9/1995 | Kirsch | A01K 27/005 119/865 |
| 6,948,218 | B1 * | 9/2005 | Donze | A01K 27/005 119/774 |
| 7,389,750 | B1 * | 6/2008 | Rogers | A01K 27/005 119/792 |
| 9,284,181 | B1 * | 3/2016 | Nieslanik | B68B 5/06 |
| 9,314,001 | B2 * | 4/2016 | Siwak | A01K 27/005 |
| 10,351,095 | B2 | 7/2019 | Murasaki et al. | |
| 10,399,538 | B2 | 9/2019 | Hata et al. | |
| 10,441,036 | B2 | 10/2019 | Hayashi et al. | |
| 10,455,903 | B2 | 10/2019 | Nimura et al. | |
| 10,499,617 | B1 | 12/2019 | Dempsey | |
| 2004/0208692 | A1 * | 10/2004 | Anthony | A01K 27/005 403/327 |
| 2010/0031897 | A1 * | 2/2010 | Moeller | A01K 27/005 119/792 |
| 2012/0210542 | A1 * | 8/2012 | Yang | F16B 21/165 24/369 |
| 2012/0279024 | A1 * | 11/2012 | Knox | F16B 45/02 24/265 H |
| 2014/0143986 | A1 * | 5/2014 | Genova | A01K 27/005 24/369 |
| 2015/0069775 | A1 * | 3/2015 | Knox | F16B 45/02 294/82.15 |

(Continued)

*Primary Examiner* — Robert Sandy
*Assistant Examiner* — David M Upchurch
(74) *Attorney, Agent, or Firm* — ZANIP

(57) ABSTRACT

A pull buckle, which includes a lock body, a fastener, a first elastic member and a key assembly. The lock body is provided with a mounting cavity and an insertion port. One end of the fastener is provided with a connecting portion, which is inserted in the mounting cavity. The first elastic member is defined on a bottom wall of the mounting cavity and the bottom wall faces to the insertion port; the first elastic member contacts with the connecting portion when the fastener is inserted in the mounting cavity. The key assembly is clamped to the connecting portion so as to lock the fastener in the mounting cavity; or the key assembly is pressed to unlock the connecting portion, the first elastic member ejects the connecting portion out of the mounting cavity and releases the fastener.

20 Claims, 9 Drawing Sheets

(56) References Cited

U.S. PATENT DOCUMENTS

2016/0375569 A1\* 12/2016 Nielsen .................. E21F 17/02
                                                                         29/270
2018/0027776 A1\*  2/2018 Chen .................... A01K 27/005

\* cited by examiner

PULL BUCKLE

CROSS-REFERENCE TO RELATED APPLICATIONS

This application claims the benefit of priority from Chinese Patent Application No. CN201911208015.6, filed on Nov. 30, 2019. The content of the aforementioned application, including any intervening amendments thereto, is incorporated herein by reference in its entirety.

TECHNICAL FIELD

The invention relates to the technical field of buckle, in particular to pull buckles.

BACKGROUND OF THE INVENTION

Pull buckle is a connector, it can be used to pet traction ropes to connect the traction rope to the neck ring. The pull buckle has a button body and the fastener. When the user presses the unlocking key of the existing pull buckle, the user also has to pull the button body and the fastener to separate the two. The disadvantage of such pull buckle is that it is inconvenient to use.

SUMMARY OF THE INVENTION

The object of the present invention is to provide with a pull buckle structure with a button body and a fastener, to solve the technical problem that the user will open the button body and the fastener after pressing the unlocked button in the prior art.

In order to achieve the above object, the present invention provides with a pull buckle, which includes a buckle body, a fastener, a first elastic member and a key assembly.

The buckle body is provide with a mounting cavity and an insertion port connected with the mounting cavity.

One end of the fastener is provided with a connecting portion, which is inserted the mounting cavity through the insertion port.

The first elastic member is defined on a bottom wall of the mounting cavity and faces to the insertion port; the first elastic member comes into contact with the connecting portion when the fastener is inserted in the mounting cavity.

The key assemblies, which are clamped to the connecting portion so as to lock the fastener in the mounting cavity; or the key assemblies are pressed to unlock the connecting portion, the first elastic member is used to eject the connecting portion out of the mounting cavity and release the fastener.

Preferably, each of the key assemblies includes a key, a stopper, and a second elastic member; the second elastic member is defined on a side wall of the mounting cavity, the side wall is on a side of said insertion port; the stopper comes into to contact with the second elastic member and is rotatably arranged in the mounting cavity. The key is movably defined on the lock body and drives the stopper to rotate; when the connecting portion is inserted the mounting cavity, the connecting portion presses the first elastic number to compress, the second elastic member drives the stopper to be clamped to a side portion of the connecting portion, thereby the fastener is fixedly connected to the lock body. When the key is pressed, it drives the stopper to rotate so as to be separated from the side portion of the connecting member, the first elastic member is reset to drive the connecting member to eject out of the mounting cavity so that the fastener is separated from the lock body.

Preferably, a rotating shaft is arranged in the mounting cavity, and the stopper is rotatably arranged on the rotating shaft; the stopper comprises a force-bearing portion and a clamping portion; the force-bearing portion comes into contact with the key, and the clamping portion is clamped with the second elastic member.

Preferably, an outer side surface of the clamping portion is provided with a first limiting groove, a side surface of the mounting cavity is provided with a second limiting groove, the two ends of the second elastic number are respectively defined in the first limiting groove and the second limiting groove. Preferably, its outer surface of the connecting member is provided with a clamping groove; when the connecting member is inserted into the mounting cavity, the second elastic member drives the clamping portion to insert the clamping groove; when the key is pressed, the key drives the clamping portion to rotate out of the clamping groove through the force-bearing portion.

Preferably, the number of the key assemblies is two, the key assemblies are symmetrically arranged on the lock body.

Preferably, the end of the connecting portion is provided with a conical plane, and the top surface of the stopper is provided with an oblique plane; when the connecting portion is inserted into the mounting cavity, the conical plane is matched with the oblique plane.

Preferably, the lock body is provided with key holes corresponding to each of the keys; each of the keys extends out from one of the key holes; a guiding block is arranged on the surrounding edge of each of the keys; a guiding slot is arranged on the inner wall of the mounting cavity; and the guiding block is guided in the guiding slot and is defined to the inner wall of the mounting cavity.

Preferably, the top of the mounting cavity is provided with two baffles, the two baffles are respectively located on both sides of the insertion port, the top surfaces of two of the stoppers are respectively provided with a gap, and two of the gaps are matched with the baffles.

Preferably, the mounting cavity is provided with a plate, which divides the mounting cavity into an upper cavity and a lower cavity. The insertion port is arranged on the top wall of the upper cavity; the connecting portion extends into the upper cavity through the insertion portion; the bottom of the first elastic member is fixed on the bottom wall of the lower cavity; the plate is provided with a through hole, the through hole and the insertion port are coaxially arranged; and the top of the first elastic member passes through the through hole.

One or more of the above technical schemes in the pull buckle structure provided in the present invention has at least one of the following technical effects: When the pull buckle structure is used, the connecting portion is inserted into the mounting cavity, the first elastic member is in contact with the connecting portion, the key assemblies is clamped with the connecting portion and locks the fastener in the mounting cavity; when the fastener is separated with the lock body, the key assemblies unlocks the connecting portion, the first elastic member is used for ejecting the connecting portion out of the mounting cavity and releasing the fastener. The pull buckle structure can be unlocked by pressing the key assemblies, and the first elastic member is used for ejecting the fastener out of the lock body, which has the advantages of convenient use.

BRIEF DESCRIPTION OF THE DRAWINGS

In order to explain more clearly the technical proposals in the embodiment of the invention, the following will briefly introduce the drawings that need to be used in the embodiment or the prior art description. It is obvious that the drawings in the following description are only some embodiments of the invention, and for the ordinary technical personnel in the field, other drawings can be obtained according to these drawings without paying creative labor.

DETAILED DESCRIPTION OF EMBODIMENTS

Figure 1:
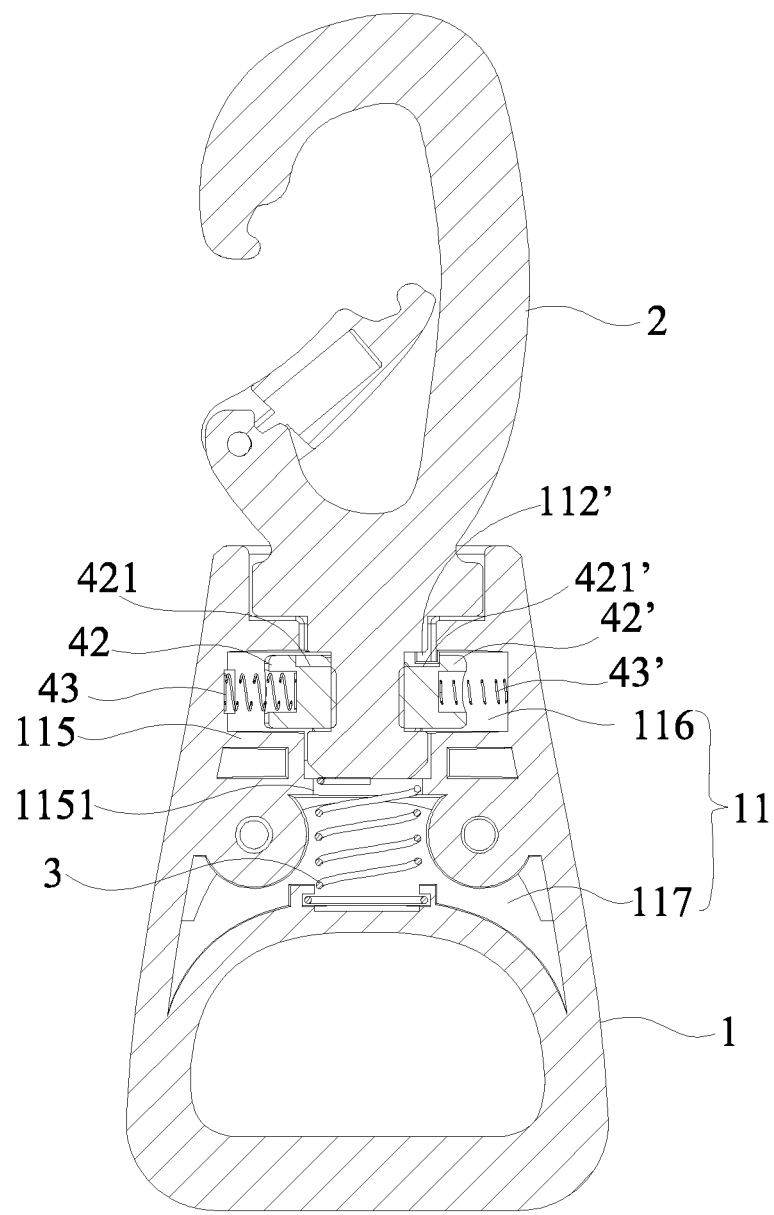
FIG. 1 is an section view of the pull buckle structure according to the present invention.

Embodiments of the present invention are described in detail below, and an example of the embodiment is shown in the attached drawings, in which the same or similar label represents the same or similar element or element with the same or similar function. the embodiments described below by reference to the attached drawings are exemplary and are intended to explain embodiments of the present invention and cannot be understood as restrictions in the present invention.

Reference to FIG. 1-9, the present invention discloses a pull buckle which includes a lock body 1, a fastener 2, a first elastic member 3 and key assemblies 4,4'.

The lock body 1 is provide with a mounting cavity 11 and an insertion port 111 connected with the mounting cavity 11.

One end of the fastener 2 is provided with a connecting portion 21, which is inserted in the mounting cavity 11 through the insertion port 111.

The first elastic member 3 is defined on its bottom wall, facing to the insertion port 111, of the mounting cavity 11. Specifically, the first elastic member 3 is a spring, its bottom end is fixed to the bottom wall, facing to the insertion port 111, of the mounting cavity 11. When the connecting portion 21 is inserted into the mounting cavity 11, the other end of the first elastic member 3 is in contact with the connecting portion 21.

The key assemblies 4, 4' are clamped to the connecting portion 21 so as to lock the fastener 2 in the mounting cavity 11; or the key assemblies 4, 4' are pressed to unlock the connecting portion 21, the first elastic member 3 is used to eject the connecting portions 21 out of the mounting cavity 11 and release the fastener 2. The pull buckle can be unlocked by pressing the key assemblies 4, 4', the first elastic member 3 ejects the fastener 2 from the lock body 1, and it has the advantage of convenient use.

In another embodiment of the invention, as shown in FIG. 1-6, the key assemblies 4, 4' include keys 41,41', stoppers 42.42' and second elastic members 43, 43'. The second elastic members 43, 43' are defined on a side wall, on the side of the insertion port 111, of the mounting cavity 11. Specifically, the second elastic members 43,43' are spring.

The stoppers 42, 42' are in contact with the second elastic member 43,43' and is rotatably arranged in the mounting cavity 11. The keys 41,41' are movably defined on the lock body 1 and drives the stopper 42, 42' to rotate. When the connecting portion 21 is inserted in the mounting cavity 11, it presses the first elastic member 3 to compress the first elastic member 3, the second elastic member 43, 43' drive the stoppers 42, 42' to be clamped with the side portion of the connecting portion 21, thereby the fastener 2 is fixedly connected to the lock body 1. When the keys 41,41' are pressed, the keys 41,41' drives the stopper 41,41' to rotate so as to be separated from the side portion of the connecting portion 21, the first elastic member 3 is reset to drive the connecting portion 21 to eject out of the mounting cavity 11 so that the fastener 2 is separated from the lock body 1. The pull buckle can be unlocked by pressing the key assemblies 4, 4', the first elastic member 3 ejects the fastener 2 from the lock body 1, and it has the advantage of convenient use.

In another embodiment of the invention, as shown in FIG. 1-5, rotating shafts 424, 424' are arranged in the mounting cavity 11, and the stoppers 42, 42' are rotatably arranged on the rotating shafts 424, 424'; the stoppers 42, 42' comprise a force-bearing portion 422, 422' and a clamping portion 423, 423'. Specifically, the force-bearing portion 422, 422' and the clamping portion 423, 423' may be formed in one. The stoppers 42, 42' are curved integral molding pieces. The force-bearing portion 422, 422' are in contact with the keys 41,41', and the clamping portion 423, 423' is clamped with the second elastic member 43, 43'.

In another embodiment of the invention, as shown in FIG. 1-5, rotating shafts 424, 424' are arranged in the mounting cavity 11, and the stoppers 42, 42' are rotatably arranged on the rotating shafts 424, 424'; the stoppers 42, 42' comprise a force-bearing portion 422, 422' and a clamping portion 423, 423'. Specifically, the force-bearing portion 422, 422' and the clamping portion 423, 423' may be formed in one. The stoppers 42, 42' are curved integral molding pieces. The force-bearing portion 422, 422' are in contact with the keys 41,41', and the clamping portion 423, 423' is clamped with the second elastic number 43, 43'.

Specifically, the rotating shafts 424, 424' extend through and are fixed to the joints of the force-bearing portions 422,422' and the clamping portions 423,423 ', both of the rotating shafts 424, 424' are connected to the top wall and the bottom wall of the mounting cavity 11.

Figure 4:
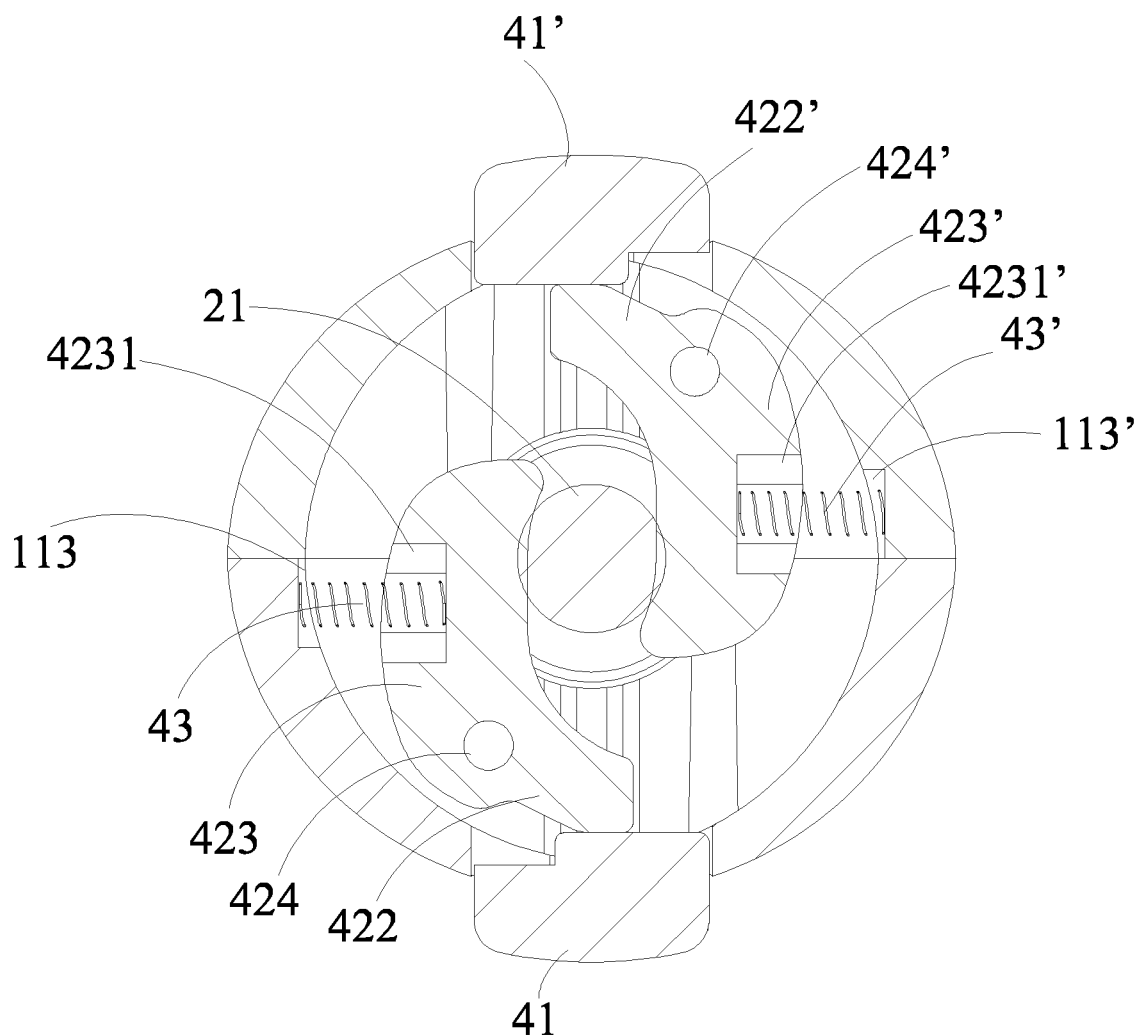
FIG. 4 is another section view of the pull buckle structure in the other state according to the present invention.

In another embodiment of the invention, as shown in FIG. 4, an outer side surface of the clamping portion 423, 423' is provided with a first limiting groove 4231, 4231', a side surface of the mounting cavity 11 is provided with a second limiting groove 113, 113', the two ends of the second elastic member 43, 43' are respectively defined in the first limiting groove 4231, 4231' and the second limiting groove 113, 113'. Specifically, the first limiting groove 4231, 4231 'and the second limiting groove 113, 113' play a fixed and limiting role on both ends of the second elastic member 42, 42'.

Figure 5:
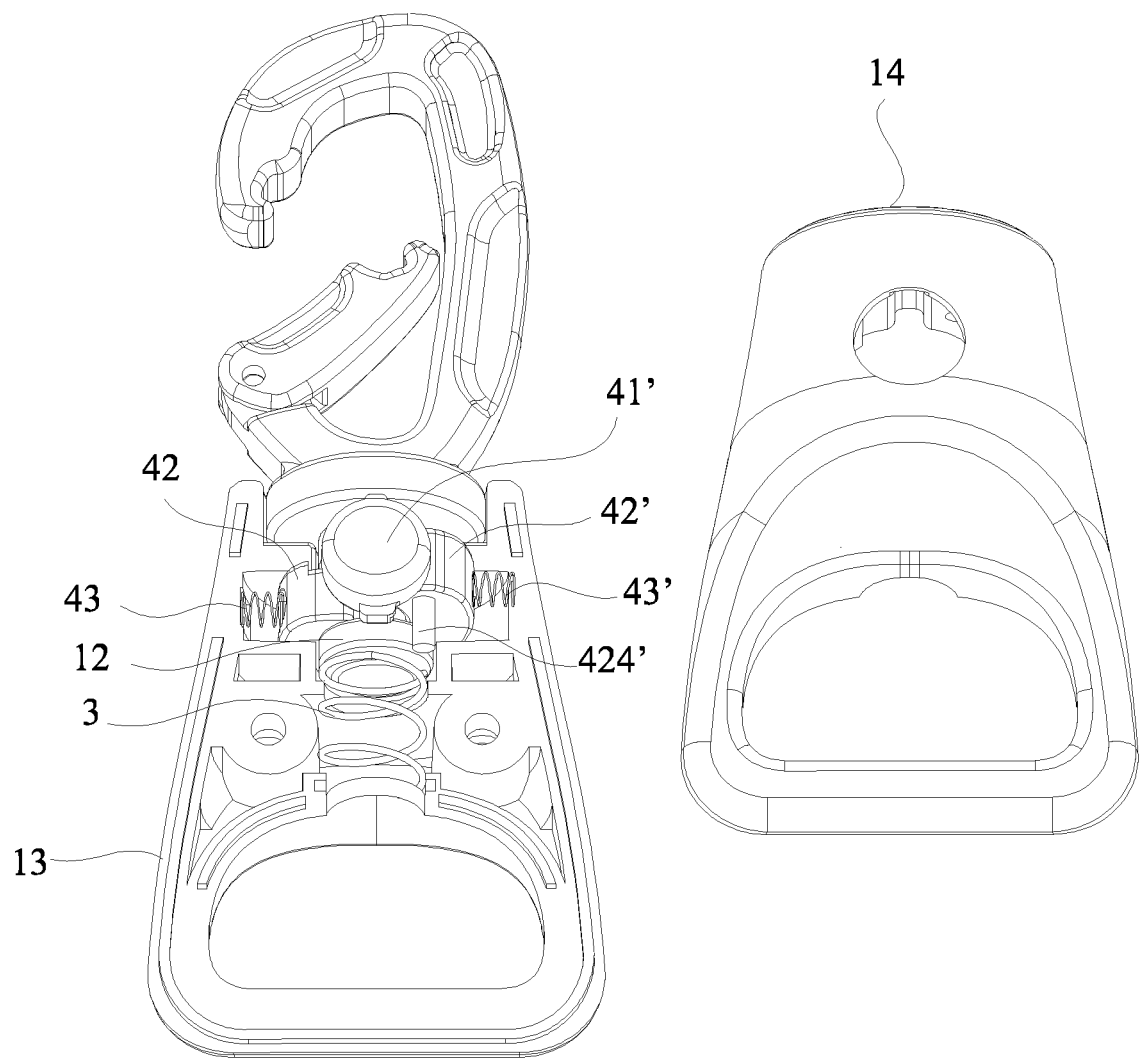
FIG. 5 is an exploded view of the pull buckle structure according to the present invention.
Figure 6:
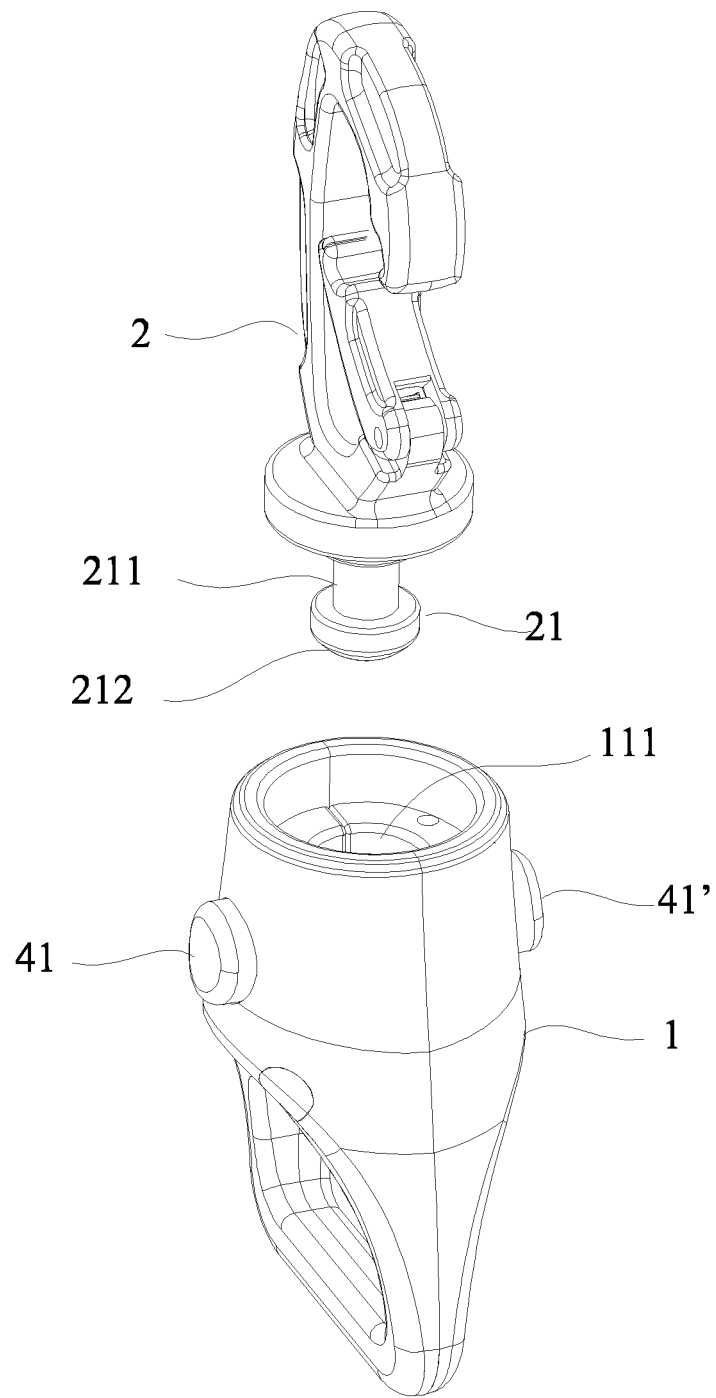
FIG. 6 is the other exploded view of the pull buckle structure according to the present invention.

In another embodiment of the invention, as shown in FIG. 4-FIG. 6, its outer surface of the connecting portion 21 is provided with a clamping groove 211. Specifically, The clamping groove 211 is a ring groove arranged on the peripheral surface of the connecting portion 21. When the connecting portion 21 is inserted into the mounting cavity 11, the second elastic member 43, 43' drives the clamping portion 423, 423' to insert the clamping groove 211. When the keys 41, 41' are pressed, the keys 41, 41' drives the clamping portions 423, 423' to rotate out of the clamping groove 211 through the force-bearing portions 422, 422'.

In another embodiment of the invention, as shown in FIG. 1-FIG. 6, the number of the key assemblies 4, 4' is two. Specifically, the structure of the he key assemblies 4, 4' are the same. When the two keys 41, 41 'are pressed at the same time, the two keys 41, 41' drive two of the stoppers 42, 42' to rotate, the two stoppers 42, 42' are separated from the connecting portion 21, the first elastic member 3 drives the connecting portion 21 to eject out of the mounting cavity 11, and the fastener 2 is separated from the lock body 1. It needs to press two keys 41,41' at the same time to unlock the pull buckle structure, which can reduce the phenomenon of unlocking caused by misoperation.

Figure 7:
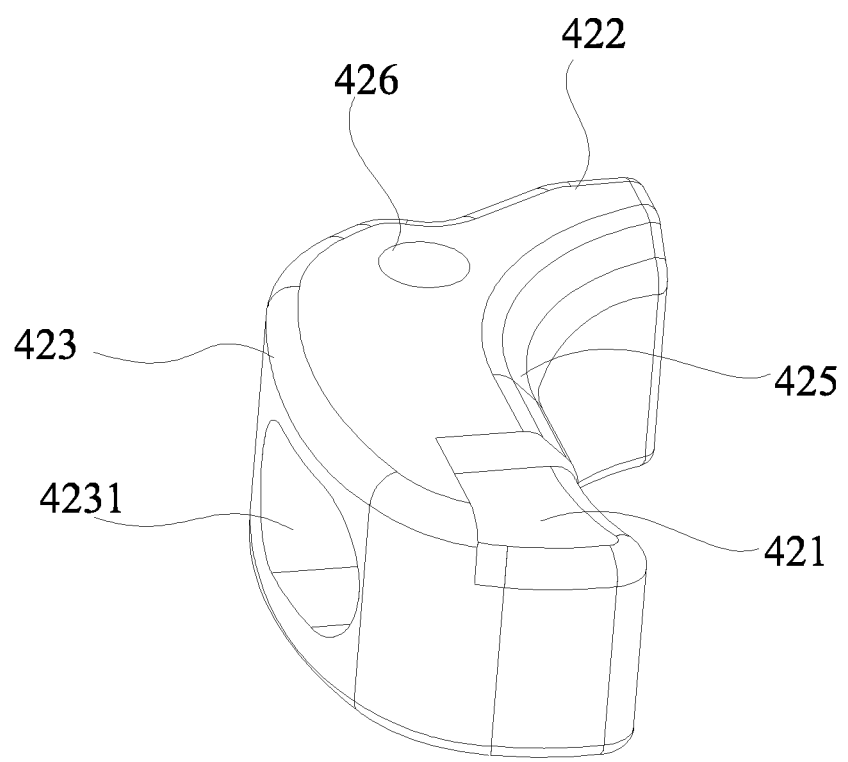
FIG. 7 is a schematic diagram of the stopper according to the present invention.

In another embodiment of the invention, as shown in FIG. 6 and FIG. 7, the end of the connecting portion 21 is provided with a conical plane 212, and the top surface of the stopper 42 is provided with an oblique plane 425. When the connecting portion 21 is inserted into the mounting cavity 11, the conical plane 212 is matched with the oblique plane 425, thereby the insertion of of the connecting portion 21 is more comfortable and the resistance is smaller.

In another embodiment of the invention, as shown in FIG. 6 and FIG. 7, the end of the connecting portion 21 is provided with a conical plane 212, and the top surface of the stopper 42 is provided with an oblique plane 425. When the connecting portion 21 is inserted into the mounting cavity 11, the conical plane 212 is matched with the oblique plane 425, thereby the insertion of the connecting portion 21 is more comfortable and the resistance is smaller.

Figure 8:
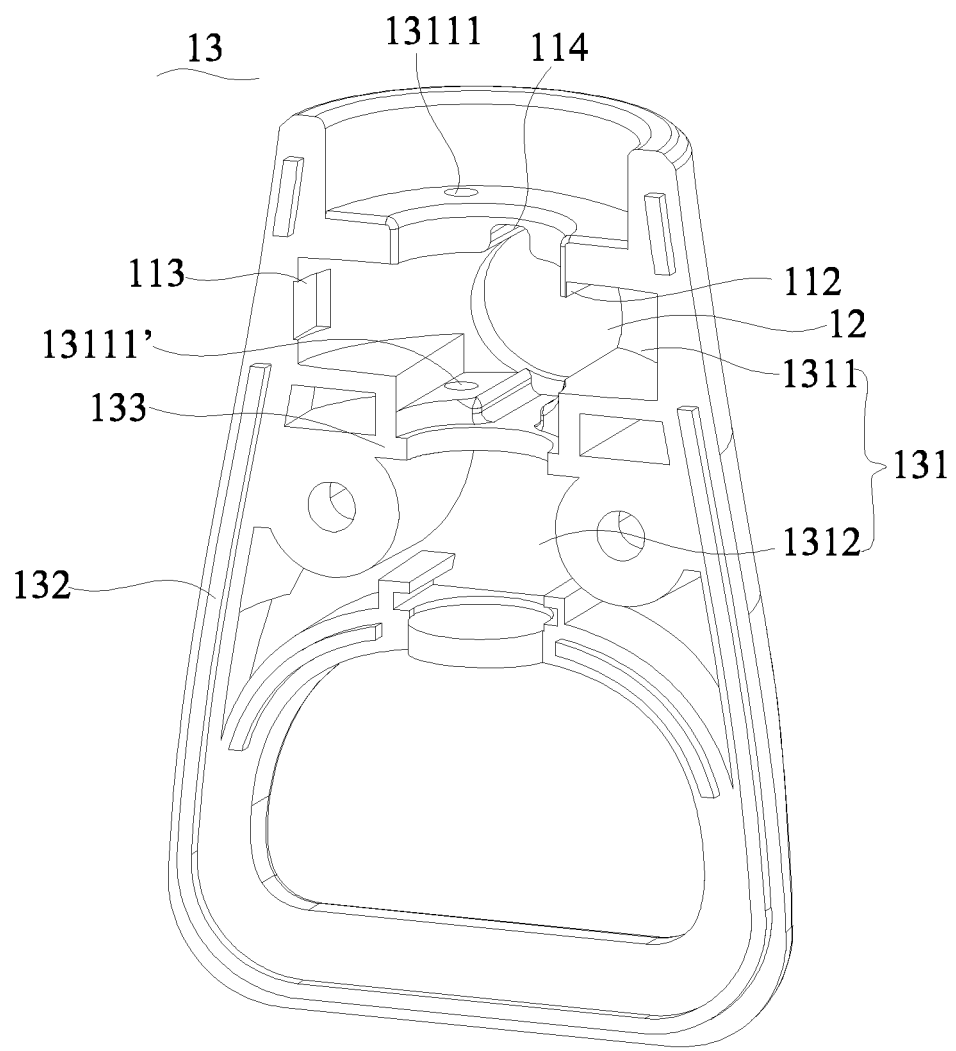
FIG. 8 is a schematic diagram of the first shell according to the present invention.
Figure 9:
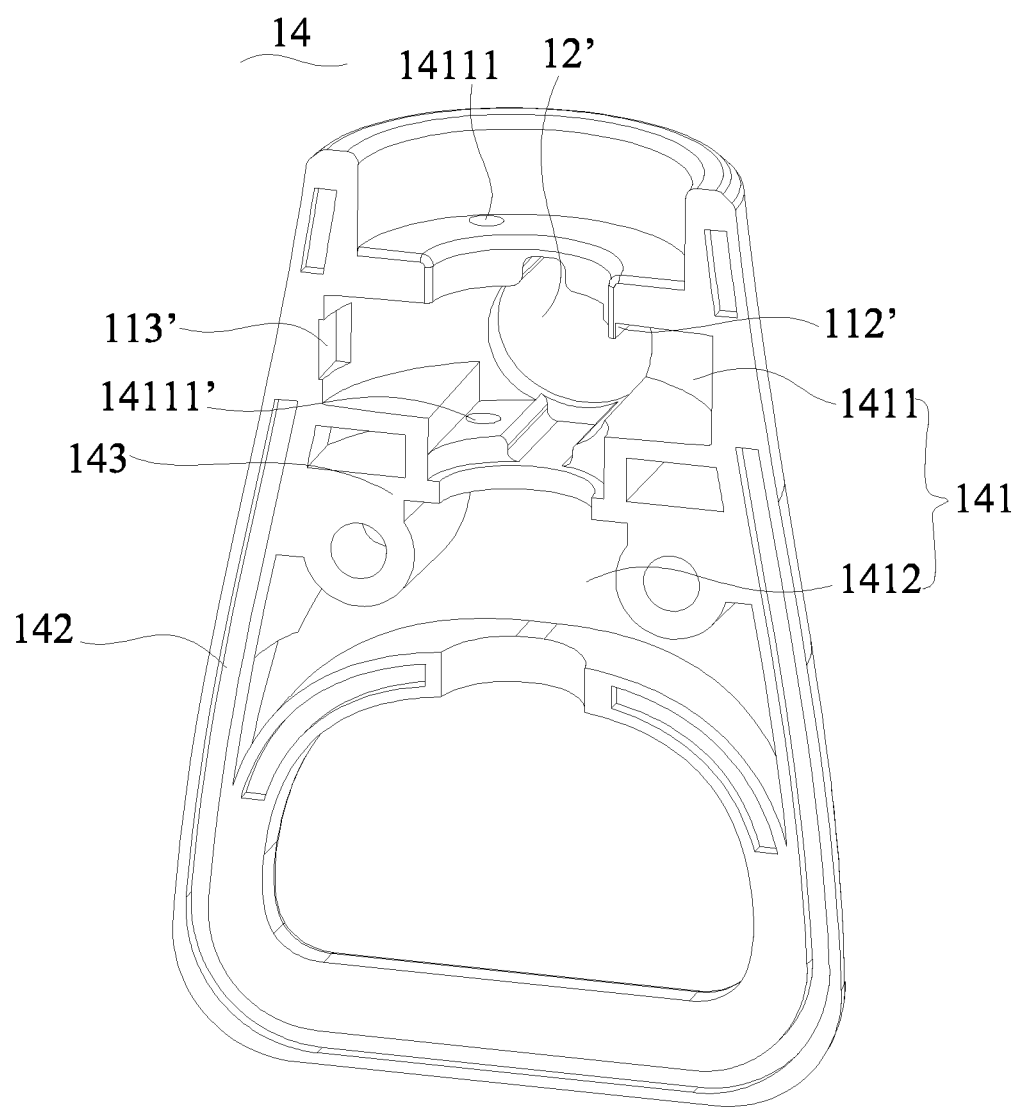
FIG. 9 is a schematic diagram of the second shell according to the present invention.

In another embodiment of the invention, as shown in FIG. 8 and FIG. 9, the lock body 1 is provided with key holes 12,12' corresponding to the keys 41, 41'. The keys 41, 41' extend the key holes 12,12' respectively. Guiding block 411 is arranged on the surrounding edge of the key 41. Specifically, the guiding block 411 and the key may be formed in one. A guiding slot 114 is arranged on the inner wall of the mounting cavity 11. Specifically, The guiding block 411 is guided in the guiding slot 114 and is defined to the inner wall surface of the mounting cavity 11. Specifically, the guide block 411 functions as a limit and guides that key 41 to slide in the direction of the guide groove 114 and is defined on the lock body 1.

In another embodiment of the invention, as shown in FIG. 8 and FIG. 9, the top of the mounting cavity 11 is provided with two baffles 112,112', the two baffles 112,112' are respectively located on both sides of the inserting port 111, the top surfaces of the two stoppers 42, 42' are respectively provided with a gap 421, 421', and the gaps 421, 421' are matched with the baffles 112,112'. Specifically, when the fastener 2 is separated from the lock body 1, the second elastic members 43, 43' drive the two stoppers 42, 42' to close to the center of the insertion port 111, and the baffle 112,112' are in contacts with the side wall of the gaps 421, 421', thereby defining the two stoppers 43, 43' to both sides of the insertion port 111 respectively to facilitate the insertion of the connecting portion 21.

Figure 2:
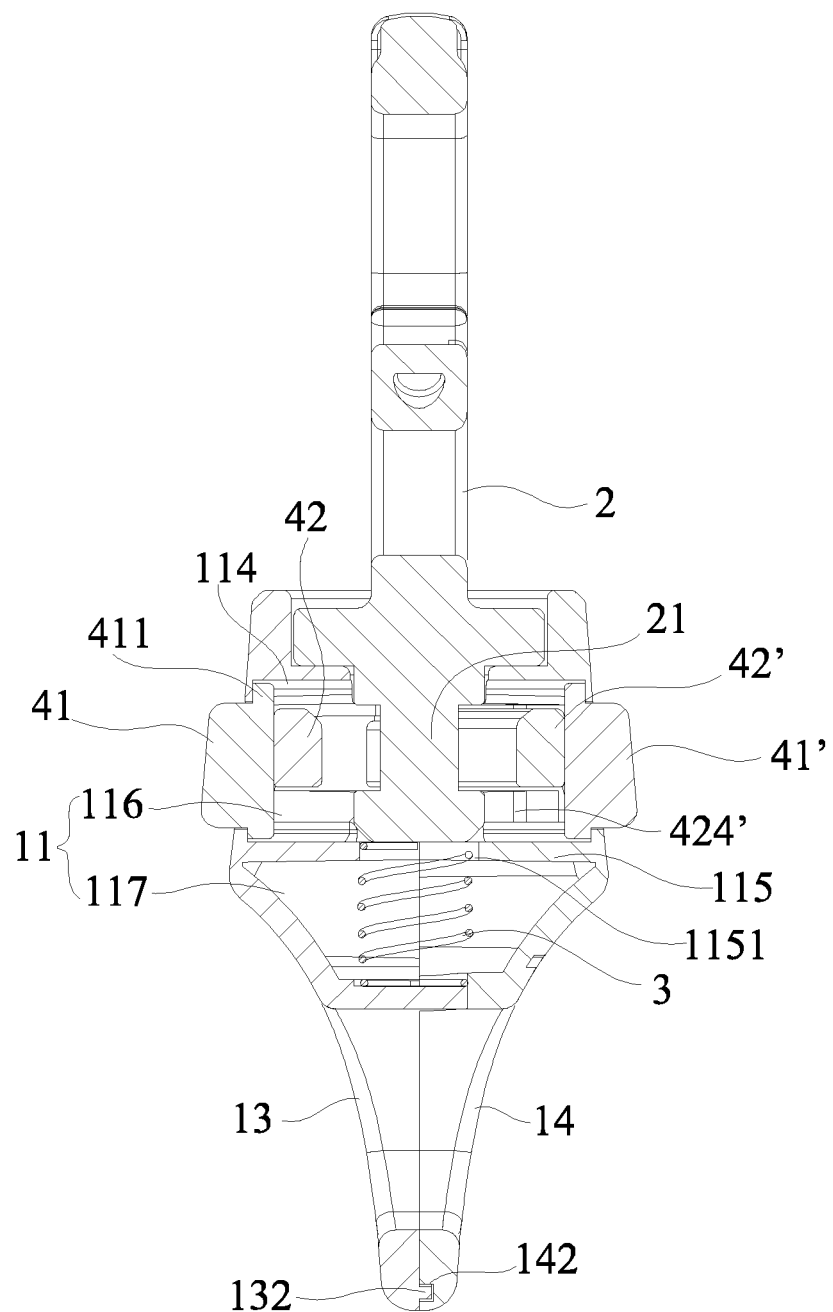
FIG. 2 is the other section view of the pull buckle structure according to the present invention.
Figure 3:
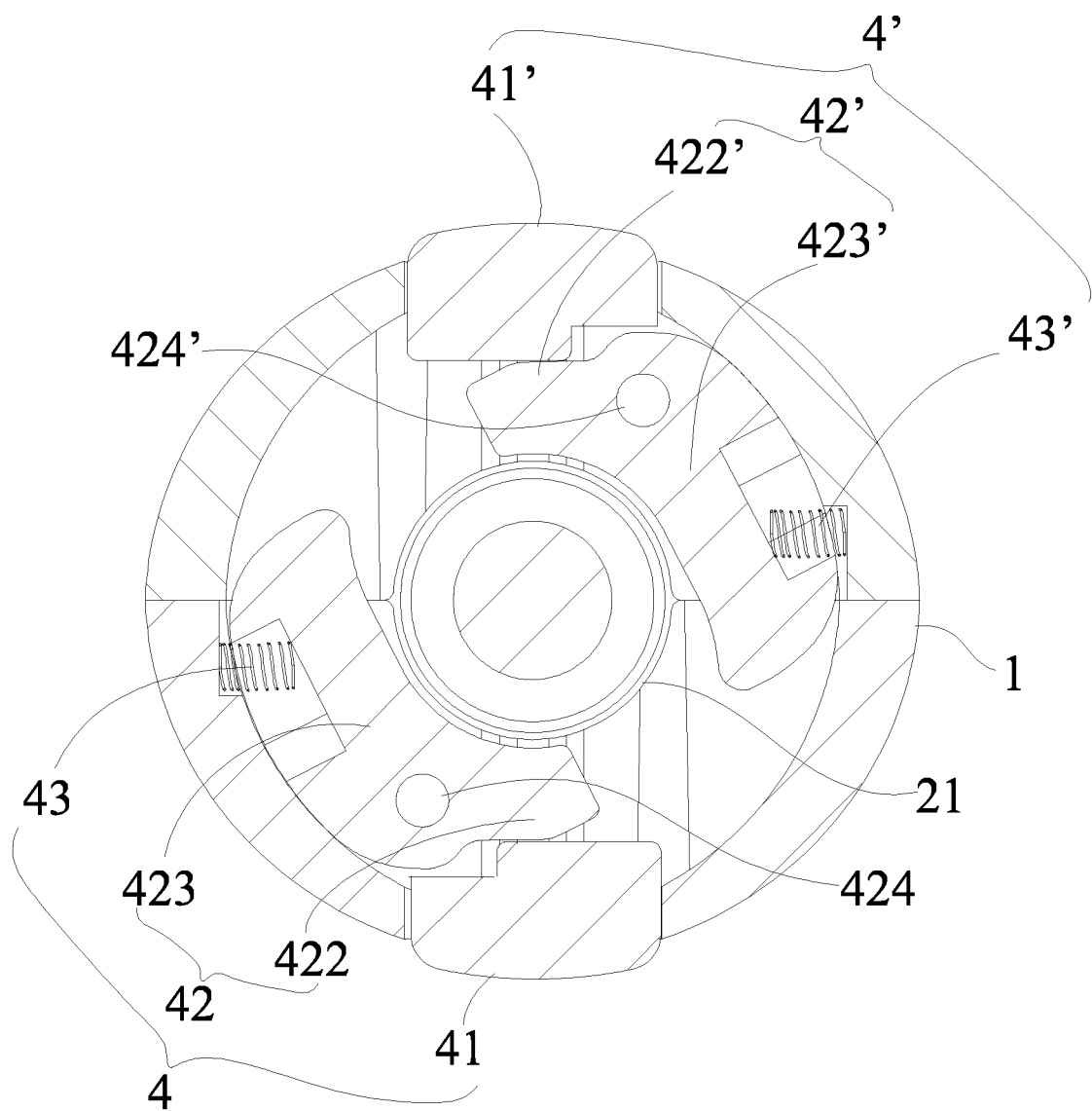
FIG. 3 is another section view of the pull buckle structure according to the present invention.

In another embodiment of the invention, as shown in FIG. 1 and FIG. 2, the mounting cavity 11 is provided with a plate 115. Specifically, the plate 115 and the lock body 1 are formed in one. The plate 115 divides the mounting cavity 11 into an upper cavity 116 and a lower cavity 117. The insertion port 111 is arranged on the top wall of the upper cavity 116; the connecting portion 21 extends into the upper cavity 116 through the insertion portion 111. The bottom of the first elastic member 3 is fixed on the bottom wall of the lower cavity 117. The plate 115 is provided with a through hole 1151, the through hole 1151 and the insertion port 111 are coaxially arranged. The top of the first elastic member 3 passes through the through hole 1151 to extend to the upper cavity 116. The through hole 1151 acts as a limit on the first elastic member 3 and prevents the first elastic member 3 from swinging.

In another embodiment of the invention, as shown in FIG. 8 and FIG. 9, the lock body 1 includes a first shell body 13 and a second shell body 14. The first shell body 13 is provided with a first slot body 131 and a first partition 133, the first slot body 131 is divided into a first upper slot body 1311 and a first lower slot body 1312 by the first partition 133, and the top wall and the bottom wall of the first upper slot body 1311 are respectively provided with a first shaft hole 13111, 13111' for installing both ends of the shaft 424.

As shown in FIG. 8 and FIG. 9, the periphery of the first slot body 131 is provided with a fitting rib 132. The second shell 14 is provided with a second slot body 141 and a second partition plate 143, the second slot body 141 is divided into a second upper slot body 1411 and a second lower slot body 1412 by the second partition 143. The top wall and the bottom wall of the second upper groove body 1411 are respectively provided with a first shaft hole 14111, 14111 ' for installing both ends of the shaft 424'.

As shown in FIG. 8 and FIG. 9, the periphery of the second slot body 141 is provided with a fitting groove 142. The first shell 13 and the second shell 14 are in threaded connection. The fitting rib 132 is embedded in the fitting groove 142, and It has the advantages of accurate mounting and positioning, and convenient assembly and disassembly.

Specifically, after the first shell 13 and the second shell 14 are assembled, the first partition 133 and the second partition 143 constitute the separator 115. The first upper slot body 1311 and the second upper slot body 1411 form the upper cavity 116. The first lower slot body 1312 and the second lower slot body 1412 form the lower cavity 117.

The above description is only the preferred embodiment of the present invention, and is not intended to limit the present invention, and any modifications, equivalents, and improvements made within the spirit and principles of the present invention should be included within the scope of the present invention.

What is claimed:

1. A pull buckle, comprising:
   a lock body, which is provided with a mounting cavity and an insertion port connected with said mounting cavity;
   a fastener, one end of said fastener is provided with a connecting portion, which is inserted in said mounting cavity through said insertion port;
   wherein, also comprising:
   a first elastic member, which is defined on a bottom wall of said mounting cavity and faces to said insertion port; said first elastic member contacts with said connecting portion when said fastener is inserted in said mounting cavity;
   key assemblies, which are clamped to said connecting portion so as to lock said fastener in said mounting cavity; or said key assemblies are pressed to unlock said connecting portion, said first elastic member is used to eject said connecting portion out of said mounting cavity and release said fastener.

2. The pull buckle according to claim 1, wherein each of said key assemblies includes a key, a stopper, and a second elastic member with two ends; said second elastic member is defined on a side wall of said mounting cavity, said side wall is on a side of said insertion port; said stopper contacts with said second elastic member and is rotatably arranged in said mounting cavity, said key is movably defined on said lock body and drives said stopper to rotate; when said connecting portion is inserted in said mounting cavity, said connecting portion presses said first elastic member to compress, said second elastic member drives said stopper to be clamped to a side portion of said connecting portion, thereby said fastener is fixedly connected to said lock body; when said key is pressed, said key drives said stopper to rotate so as to be separated from said side portion of said connecting portion, said first elastic member is reset to drive said connecting portion to eject out of said mounting cavity so that said fastener is separated from said lock body.

3. The pull buckle according to claim 2, wherein a rotating shaft is arranged in said mounting cavity, and said stopper is rotatably arranged on said rotating shaft; said stopper comprises a force-bearing portion and a clamping portion; said force-bearing portion comes into contact with said key, and said clamping portion is clamped with said second elastic member.

4. The pull buckle according to claim 3, wherein an outer side surface of said clamping portion is provided with a first limiting groove, a side surface of said mounting cavity is provided with a second limiting groove, said two ends of said second elastic member are respectively defined in said first limiting groove and said second limiting groove.

5. The pull buckle according to claim 3, wherein an outer surface of said connecting portion is provided with a clamping groove; when said connecting portion is inserted into said mounting cavity, said second elastic member drives said clamping portion to insert said clamping groove; when said key is pressed, said key drives said clamping portion to rotate out of said clamping groove through force-bearing portion.

6. The pull buckle according to claim 1, wherein the number of said key assemblies is two, said key assemblies are symmetrically arranged on said lock body.

7. The pull buckle according to claim 2, wherein an end of said connecting portion is provided with a conical plane, and a top surface of said stopper is provided with an oblique plane; when said connecting portion is inserted into said mounting cavity, said conical plane is matched with said oblique plane.

8. The pull buckle according to claim 3, wherein an end of said connecting portion is provided with a conical plane, and a top surface of said stopper is provided with an oblique plane; when said connecting portion is inserted into said mounting cavity, said conical plane is matched with said oblique plane.

9. The pull buckle according to claim 4, wherein an end of said connecting portion is provided with a conical plane, and a top surface of said stopper is provided with an oblique plane; when said connecting portion is inserted into said mounting cavity, said conical plane is matched with said oblique plane.

10. The pull buckle according to claim 5, wherein an end of said connecting portion is provided with a conical plane, and a top surface of said stopper is provided with an oblique plane; when said connecting portion is inserted into said mounting cavity, said conical plane is matched with said oblique plane.

11. The pull buckle according to claim 2, wherein said lock body is provided with key holes corresponding to each of said keys; each of said keys extends out from one of said key holes; a guiding block is arranged on a surrounding edge of each of said keys; a guiding slot is arranged on an inner wall of said mounting cavity; and said guiding block is guided in said guiding slot and is defined to said inner wall of said mounting cavity.

12. The pull buckle according to claim 3, wherein said lock body is provided with key holes corresponding to each of said keys; each of said keys extends out from one of said key holes; a guiding block is arranged on a surrounding edge of each of said keys; a guiding slot is arranged on an inner wall of said mounting cavity; and said guiding block is guided in said guiding slot and is defined to said inner wall of said mounting cavity.

13. The pull buckle according to claim 4, wherein said lock body is provided with key holes corresponding to each of said keys; each of said keys extends out from one of said key holes; a guiding block is arranged on a surrounding edge of each of said keys; a guiding slot is arranged on an inner wall of said mounting cavity; and said guiding block is guided in said guiding slot and is defined to said inner wall of said mounting cavity.

14. The pull buckle according to claim 5, wherein said lock body is provided with key holes corresponding to each of said keys; each of said keys extends out from one of said key holes; a guiding block is arranged on a surrounding edge of each of said keys; a guiding slot is arranged on an inner wall of said mounting cavity; and said guiding block is guided in said guiding slot and is defined to said inner wall of said mounting cavity.

15. The pull buckle according to claim 2, wherein a top of said mounting cavity is provided with two baffles, said two baffles are respectively located on both sides of said insertion port, top surfaces of two of said stoppers are provided with a gap respectively, and two of said gaps are matched with said two baffles.

16. The pull buckle according to claim 3, wherein a top of said mounting cavity is provided with two baffles, said two baffles are respectively located on both sides of said insertion port, top surfaces of two of said stoppers are provided with a gap respectively, and two of said gaps are matched with said two baffles.

17. The pull buckle according to claim 4, wherein a top of said mounting cavity is provided with two baffles, said two baffles are respectively located on both sides of said insertion port, top surfaces of two of said stoppers are provided with a gap respectively, and two of said gaps are matched with said two baffles.

18. The pull buckle according to claim 5, wherein a top of said mounting cavity is provided with two baffles, said two baffles are respectively located on both sides of said insertion port, top surfaces of two of said stoppers are provided with a gap respectively, and two of said gaps are matched with said two baffles.

19. The pull buckle according to claim 1, wherein said mounting cavity is provided with a plate, which divides said mounting cavity into an upper cavity and a lower cavity; said insertion port is arranged on a top wall of said upper cavity; said connecting portion extends into said upper cavity through said insertion portion; a bottom of said first elastic member is fixed on a bottom wall of said lower cavity; said plate is provided with a through hole, said through hole and said insertion port are coaxially arranged; and a top of said first elastic member passes through said through hole.

20. The pull buckle according to claim 2, wherein said mounting cavity is provided with a plate, which divides said mounting cavity into an upper cavity and a lower cavity; said insertion port is arranged on a top wall of said upper cavity; said connecting portion extends into said upper cavity through said insertion portion; a bottom of said first elastic member is fixed on a bottom wall of said lower cavity; said plate is provided with a through hole, said through hole and said insertion port are coaxially arranged; and a top of said first elastic member passes through said through hole.

* * * * *